US011580200B2

(12) United States Patent
Balasa et al.

(10) Patent No.: US 11,580,200 B2
(45) Date of Patent: Feb. 14, 2023

(54) CODE IDENTIFICATION

(71) Applicant: INTERNATIONAL BUSINESS MACHINES CORPORATION, Armonk, NY (US)

(72) Inventors: Adelina Balasa, Southampton (GB); Andrew S. Feltham, Chandlers Ford (GB); Andreas Martens, Fair Oak (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 377 days.

(21) Appl. No.: 16/678,177

(22) Filed: Nov. 8, 2019

(65) Prior Publication Data
US 2020/0074050 A1    Mar. 5, 2020

Related U.S. Application Data

(63) Continuation of application No. 15/408,657, filed on Jan. 18, 2017, now Pat. No. 10,534,898.

(51) Int. Cl.
*G06F 7/04* (2006.01)
*H04N 7/16* (2011.01)
*G06F 21/16* (2013.01)

(52) U.S. Cl.
CPC .................................. *G06F 21/16* (2013.01)

(58) Field of Classification Search
CPC ............ G06F 21/16; G06F 2221/0733; H04N 2201/3233; H04N 1/32149; H04N 2201/323; H04N 1/32299; H04N 1/32315
See application file for complete search history.

(56) References Cited

U.S. PATENT DOCUMENTS

| | | | |
|---|---|---|---|
| 7,231,524 B2 | 6/2007 | Burns | |
| 7,894,630 B2 | 2/2011 | Pullen et al. | |
| 8,140,850 B2 | 3/2012 | Horne et al. | |
| 2004/0202324 A1* | 10/2004 | Yamaguchi | ............ G06F 21/16 380/201 |

(Continued)

FOREIGN PATENT DOCUMENTS

| | | | | |
|---|---|---|---|---|
| WO | 0154396 A1 | | 7/2001 | |
| WO | WO-0154396 A1 * | | 7/2001 | ........... G06F 40/123 |
| WO | 01/69355 | | 9/2001 | |

OTHER PUBLICATIONS

Gupta et al., "Source Code Watermarking Based on Function Dependency Oriented Sequencing", Macquarie University, International Conference on Intelligent Information Hiding and Multimedia Signal Processing, 2008, 4 pages.

(Continued)

*Primary Examiner* — Trong H Nguyen
(74) *Attorney, Agent, or Firm* — Monchai Chuaychoo; Andrew D. Wright; Calderon Safran & Cole P.C.

(57) ABSTRACT

Systems and method for watermarking portions of code for the purposes of identification are described. A computer-implemented method of watermarking a portion of code with identification data includes: determining, by a computing device, a number of existing whitespace characters in the portion of code; encoding, by the computing device, the identification data using a set of reference whitespace characters; and embedding, by the computing device, the encoded identification data into the portion of code, wherein the embedding the encoded identification data includes, based on the determined number of existing whitespace characters, either replacing existing whitespace characters in the portion of code with the encoded identification data or inserting the encoded identification data characters into the portion of code.

17 Claims, 6 Drawing Sheets

(56) References Cited

U.S. PATENT DOCUMENTS

| | | | |
|---|---|---|---|
| 2005/0262347 A1 | 11/2005 | Sato et al. | |
| 2007/0047758 A1* | 3/2007 | Pullen ................... | G06F 40/163 |
| | | | 382/100 |
| 2008/0049971 A1* | 2/2008 | Ramos .................. | G06F 40/143 |
| | | | 382/100 |
| 2011/0314550 A1* | 12/2011 | Mastrangelo ......... | G06T 1/0021 |
| | | | 726/26 |
| 2014/0157441 A1* | 6/2014 | Georgiev ................ | G06F 16/84 |
| | | | 726/32 |
| 2018/0203983 A1 | 7/2018 | Balasa et al. | |

OTHER PUBLICATIONS

Mir, "Copyright Protection Based on Contextual Web Watermarking", Effat University, 2013, 2 pages.

Stack Exchange, http://data.stackexchange.com/, Dec. 16, 2016, 21 pages.

A New Code License: The MIT, this time with Attribution Required, http://meta.stackexchange.com/questions/272956/a-new-code-license-the-mit-this-time-with-attribution-required. Stack Exchange, Jan. 15, 2016, 35 pages.

Why is it faster to process a sorted array than an unsorted array?, http://stackoverflow.eom/questions/11227809/why-is-processing-a-sorted-array-faster-than-an-unsorted-array, Stack Overflow, accessed Jan. 17, 2017, 18 pages.

List of IBM Patents or Patent Applications Treated as Related, dated Nov. 7, 2019, 1 page.

Anonymous, "Stack Overflow—Where Developers Learn, Share, & Build Careers", https://stackoverflow.com/, accessed Jun. 1, 2022, 12 pages.

\* cited by examiner

CODE IDENTIFICATION

BACKGROUND

The present invention relates to the field of code identification methods and in particular to the field of watermarking portions of code for the purposes of identification.

In the field of computer science, the term "code" is often used to refer to program or scripted instructions for specifying actions to be carried by a computer, processor or server. It is known for code to be written in a variety of programming, scripting, or markup languages, such as JavaScript, BASIC, Python, C, C++, C#, CSS or even HTML.

Samples or portions of code are often made available to members of the public for the purposes of providing tuition or support. There is an increasing desire to identify from where such code originates or who authored such code. Indeed, correct attribution of code is of increasing interest for the purposes of licensing, tracking popularity and to minimize plagiarism.

Typically, in order to watermark or identify code, it is known to place copyright statements within comments (e.g. at the top or bottom of the portion of code). Such copyright statements may easily be removed by a user when copying the code, whether intentional or not. Another known method of identifying an author includes comparing a first portion of code (having an unknown author) against a second portion of code (having a known author) to determine a similarity.

SUMMARY

According to an embodiment there is provided a computer-implemented method of watermarking a portion of code with identification data. The method includes: determining, by a computing device, a number of existing whitespace characters in the portion of code; encoding, by the computing device, the identification data using a set of reference whitespace characters; and embedding, by the computing device, the encoded identification data into the portion of code, wherein the embedding the encoded identification data comprises, based on the determined number of existing whitespace characters, either replacing existing whitespace characters in the portion of code with the encoded identification data or inserting the encoded identification data characters into the portion of code.

According to another embodiment, there is provided a computer program product for extracting identification data from a portion of code, the computer program product comprising a computer readable storage medium having program instructions embodied therewith. The program instructions are executable by a processor to cause the processor to: identify whitespace characters in the portion of code; extract the whitespace characters from the portion of code to obtain encoded identification data; and decode the encoded identification data to obtain the identification data.

According to yet another embodiment, there is provided a system for watermarking a portion of code with identification data. The system includes: a processor, a computer readable memory, and a computer readable storage medium associated with a computer device; program instructions to determine the number of existing whitespace characters in the portion of code; program instructions to encode the identification data using a set of reference whitespace characters; and program instructions to embed the encoded identification data into the portion of code, wherein the embedding the encoded identification data comprises, based on the determined number of existing whitespace characters, either replacing existing whitespace characters in the portion of code with the encoded identification data or inserting the encoded identification data characters into the portion of code. The program instructions are stored on the computer readable storage medium for execution by the processor via the computer readable memory.

BRIEF DESCRIPTION OF THE DRAWINGS

Preferred embodiments of the present invention will now be described, by way of example only, with reference to the following drawings, in which.

DETAILED DESCRIPTION

Figure 1:
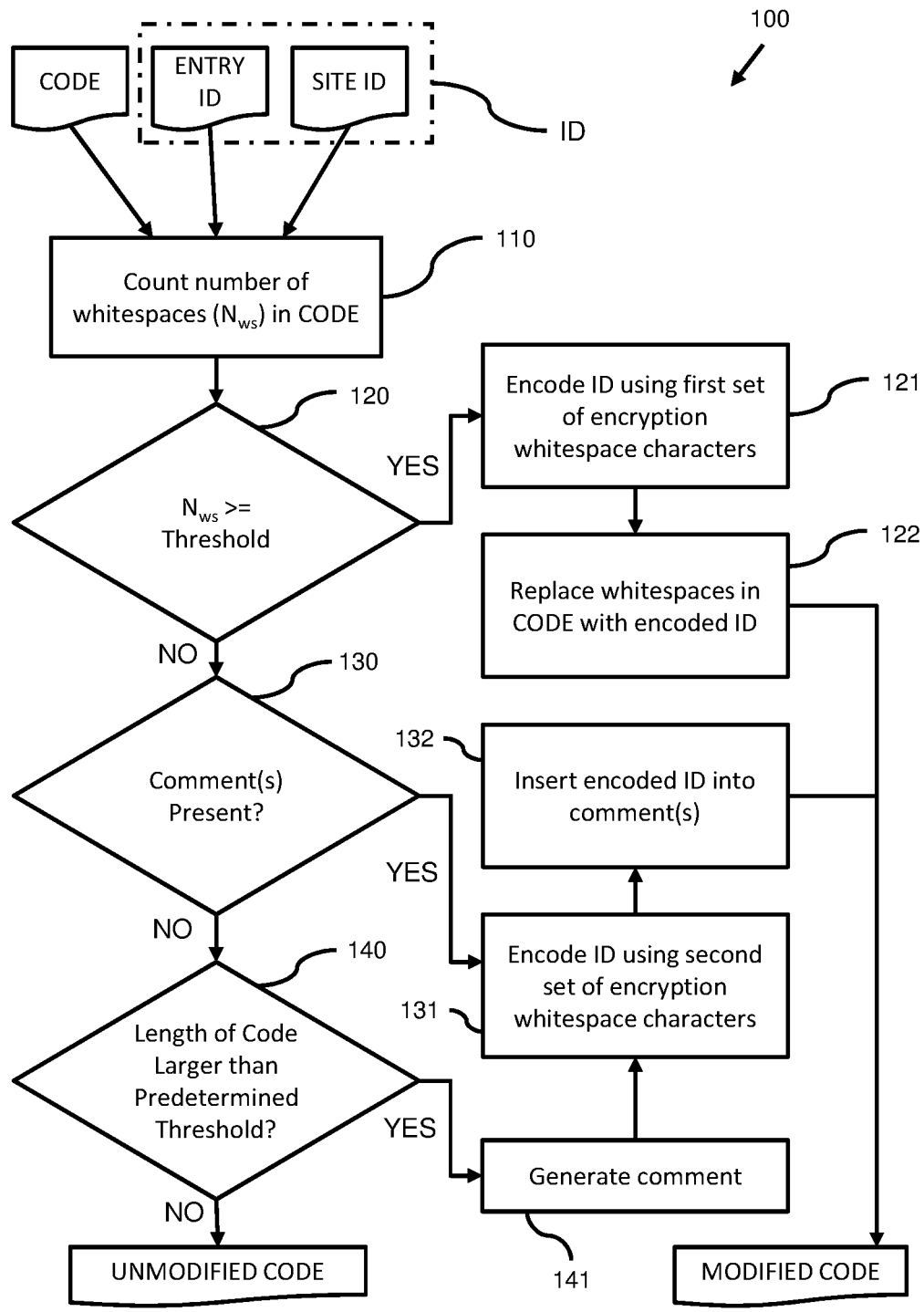
FIG. 1 illustrates a computer-implemented method of watermarking a portion of code with identification data according to an embodiment.

It should be understood that the Figures are merely schematic and are not drawn to scale. It should also be understood that the same reference numerals are used throughout the Figures to indicate the same or similar parts.

Proposed is a concept of watermarking or marking a portion of code with identification data. The concept comprises encoding or converting identification data into whitespace characters, and inserting the encoded identification data or replacing existing whitespace characters with the encoded identification data. In this way, the visual representation of the watermarked code will be substantially the same as the visual representation of the unmodified code.

The proposed concept provides the advantage that an origin of a portion of code may be provided without explicitly indicating such to a user, developer or other human. In other words, the concept allows identification data to be embedded in a portion of code (thereby watermarking the portion of code) without significantly impacting on a human's readability or visual awareness of the code. In this way, a person copying the code (e.g. for use in a separate program) will likely copy the identification data embedded in the code. Thus, a likelihood of identification data or author attribution being either intentionally or unintentionally removed will be reduced.

For the avoidance of doubt, the term 'whitespace character' is used to refer to any white space, character or series of characters that represent horizontal or vertical space in a portion of code. Whitespace characters are not typically visible to a user viewing the code (i.e. they form a blank space), such that they are often used for typographical purposes. Furthermore, whitespace characters are often used to distinguish between words (e.g. in a sentence) or tokens in a portion of code. By way of example, a first whitespace character may comprise a Space (ASCII: 0x20).

Reference to a portion of code may be alternatively taken as a snippet, section or block of code (e.g. for performing a single function) as well as a full length of code (e.g. an entire program or source code)

With reference now to FIG. 1 there is illustrated a computer-implemented method of watermarking 100 a portion of code (CODE) with identification data (ID) according to a first embodiment.

According to the first embodiment, the identification data ID comprises a first identification data portion (SITE ID) and a second identification data portion (ENTRY ID).

Presently, the first identification data portion (SITE ID) identifies a website, registry or database containing code portions available for public use. By way of example, a SITE ID "0001" may represent a first database, a SITE ID "0002" may represent a first website (e.g. host, hostname or other identifying feature) and a site ID "0003" may represent a second database and so on. In another example, the SITE ID may explicitly identify a website's hostname, authority part or IP address (e.g. as a string).

The second identification data (ENTRY ID) identifies a path, entry or record number (in the identified website, registry or database) which identifies a particular code portion. In this way, the identification data may indicate an origin of the data portion. By way of example, an ENTRY ID "0001" may represent a first entry in a database or a first path of a website, an ENTRY ID "0002" may represent a second entry in a database or a second path of a website and so on. The ENTRY ID may, for example, be a pointer or other indicating data.

Other methods of identifying an author or origin of the portion of code will be readily apparent to the person skilled in the art (e.g. name of author, email of author, identify of company, identify of organization etc.). As such, the identification data may, for example, comprise a string or number identifying an author, creator, owner or editor of the portion of code.

The method comprises counting at step 110 or calculating a number of existing whitespace characters Nws in a portion of code (CODE). In other embodiments, the method may comprise receiving the number of existing whitespace characters Nws in the portion of code. In other words, the method comprises determining or otherwise obtaining a number or count of whitespace characters Nws in the code.

The method further comprises determining at step 120 whether the counted number of whitespace characters Nws is greater than or equal to a predetermined threshold.

In response to the counted number of whitespace characters Nws being greater than or equal to the predetermined threshold, the method comprises encoding at step 121 identification data ID using a first set of reference whitespace characters to obtain encoded identification data (i.e. the identification data encoded into whitespace characters).

The first set of reference whitespace characters comprises at least two reference whitespace characters which are used to encode the identification data.

The term "reference whitespace character" should be understood to mean a predetermined or preselected whitespace character used to encode the identification data. In other words, reference whitespace characters are whitespace characters which are used to encode the identification data.

It may be understood that the encoded identification data comprises a sequence or collection of whitespace characters (e.g. a sequence of whitespace characters selected from the first set of reference whitespace characters) representing the identification data. In this way, the encoded identification data is formed solely of whitespace characters. Thus, the encoded identification data consists of an ordered sequence of reference whitespace characters.

In one embodiment, the encoding the identification data (or identification data portions) comprises encoding the identification data (portions) in a manner analogous to binary encoding. In other words, a first and second reference whitespace character may be used to encode or convert the identification data into a binary-like format (e.g. where the first reference whitespace character represents a '1' and the second reference whitespace character represents a '0).

By way of example, in a scenario in which the identification data comprises a number "0013", this may be encoded (in a binary format) as 01101. The "1" and "0" may be represented (in the encoded identification data) by a first and second reference whitespace character respectively. Thus, if the first reference whitespace character is a Space and the second reference whitespace character is a Horizontal Tab, the encoded identification data (for the number "0013") would be as follows: Tab Space Space Tab Space.

Letters or words (e.g. strings) may be encoded using the standard ASCII format. By way of example, the letter A may be represented by the binary sequence 01100001. The "1" and "0" may be represented (in the encoded identification data) by a first and second reference whitespace character respectively.

Other methods of encoding the identification data using reference whitespace characters will be readily apparent to the person skilled in the art, and are not limited to only binary-like encoding mechanism (e.g. a ternary encoding system using three reference whitespace characters).

The method further comprises replacing at step 122 existing whitespace characters (i.e. the whitespace characters existing or already present in the code) with the encoded identification data.

Put another way, in response to the counted number of whitespace characters Nws being greater than or equal to a predetermined threshold, the method comprises replacing at step 122 existing whitespace characters (i.e. the whitespace characters existing or already present in the code) with the encoded identification data.

In performing the replacing at step 122 of the existing whitespace characters, the method may comprise replacing a first existing whitespace character with a first reference whitespace character from the encoded identification data, a second existing whitespace character with a second reference whitespace character from the encoded identification data and so on. In some embodiments, the method comprises sequentially replacing each existing whitespace character in the portion of code (i.e. beginning with the first existing whitespace character) with a respective whitespace character in the encoded identification data.

In response to all encoded whitespace characters in the encoded identification data being used (e.g. if the encoded identification data is formed of 10 whitespace characters, and 10 existing whitespace characters have been replaced) the method may comprise repeatedly replacing existing whitespace characters with respective whitespace characters from the encoded identification data.

By way of example, consider a scenario in which the encoded identification data comprises 10 encoded whitespace characters, and the total number of existing whitespace characters in the code is 50. The first 10 existing whitespace characters may each be respectively replaced by one of the 10 whitespace characters of the encoded identification data. The second 10 existing whitespace characters may then each be respectively replaced by one of the 10 whitespace characters of the encoded identification data. This process may be repeated until all existing whitespace characters are replaced. Thus, in this scenario, the encoded identification data is present in the modified code 5 times.

Upon replacing the whitespace characters, the code may be considered as watermarked or modified. In other words, the replacing of the existing whitespace characters in the code watermarks the code to form modified or watermarked code. The method may comprise outputting such modified code.

By replacing the existing whitespace characters with the encoded identification data, the identification data may be embedded within the portion of code without significantly or substantially altering the visual impact or appearance of the portion of code. In other words, a user would observe little to no difference between the unmodified code (i.e. non-watermarked portion of code code) and the modified code (i.e. the code in which the identification data has been embedded).

Furthermore, replacement of existing whitespace characters (rather than insertion) minimizes the likelihood of a compiler or code editor will remove the whitespace characters during a 'clean up' process (in which excess whitespace characters are removed).

Moreover, replacing existing whitespace characters (i.e. with the encoded identification data) will not have an effect on the way in which programming code compiles and executes.

It has been recognized that providing more than one copy of the encoded identification data (i.e. repeating the encoded identification data) increases the likelihood that an ability to attribute the portion of code may be maintained. By way of example, if a developer removes or copies only a part of the portion of the code, at least one repetition of the identification data is likely to also be copied across.

With continued reference to FIG. 1, in response to the counted number of whitespace characters Nws being less than the predetermined threshold, the method comprises determining at step 130 whether a comment is present in the portion of code.

In response to the presence of a comment being detected, the method comprises encoding at step 131 the identification data ID using a second set of reference whitespace characters to obtain the encoded identification data. As later detailed, it may be preferable for the second set of reference whitespace characters to be different to the first set of reference whitespace characters.

The method further comprises inserting the encoded identification data into the detected comment.

It has been herein recognized that comments are not typically removed by a code compiler or code editor during a clean-up process, such that insertion of a 'block' of whitespace characters (e.g. the encoded identification data) may be carried out without concern that it will be unintentionally removed by a code editor or compiler.

In some embodiments, in response to more than one comment being detected, the method comprises inserting the encoded identification data into more than one comment. The method may comprise distributing the encoded identification data across the more than one comments or inserting a copy of the encoded identification data into at least one of the detected comments (e.g. into each detected comment).

In response to no comment being detected, the method may comprise determining at step 140 a length of the portion of code.

In response to the portion of code being more than or equal to a second predetermined threshold, the method comprises generating at step 141 or adding a comment in the portion of code. Preferably, the generated comment is an inline comment (i.e. positioned to the side of the code) as this is recognized to reduce the likelihood of the generated comment being removed by a user (e.g. upon copying the encoded or watermarked portion of code).

The method further comprises encoding at step 131 the identification data ID using the second set of reference whitespace characters and inserting at step 132 the encoded identification data as previously described.

In response to the length of code being less than or equal to the second predetermined threshold, the method does not watermark the portion of code. In other words, the method may output unmodified code.

It has been recognized that watermarking the code when the length of code is below a second predetermined threshold may be impractical or unenforceable. By not watermarking such code, an amount of processing power (e.g. associated with a processor carrying out the described computer-implemented method) may be reduced.

In some embodiments, the method may further comprise automatically indenting the (modified or unmodified) code.

The predetermined threshold may be obtained based on a known or predicted length of the encoded identification data. By way of example, if it is predicted that the encoded identification data will be 10 characters long, the predetermined threshold may be a value 10.

In some embodiments, the identification data is encoded (e.g. using either the first or second set of reference whitespace characters) prior to determining whether the number of existing whitespace characters is greater than a predetermined threshold. In this way, the predetermined threshold may be a length of the encoded identification data. In other embodiments the predetermined threshold may be based on a proportional length of the code (e.g. if the code is 100 characters long, the predetermined threshold may be 10 characters). In yet other embodiments, the predetermined threshold may be determined based on a known minimum number of existing whitespace characters.

It will be apparent that in some conceivable embodiments, the identification data ID is encoded using the same set of reference whitespace characters regardless of whether the encoded identification data is to be inserted or to replaced existing whitespace characters.

Figure 2:
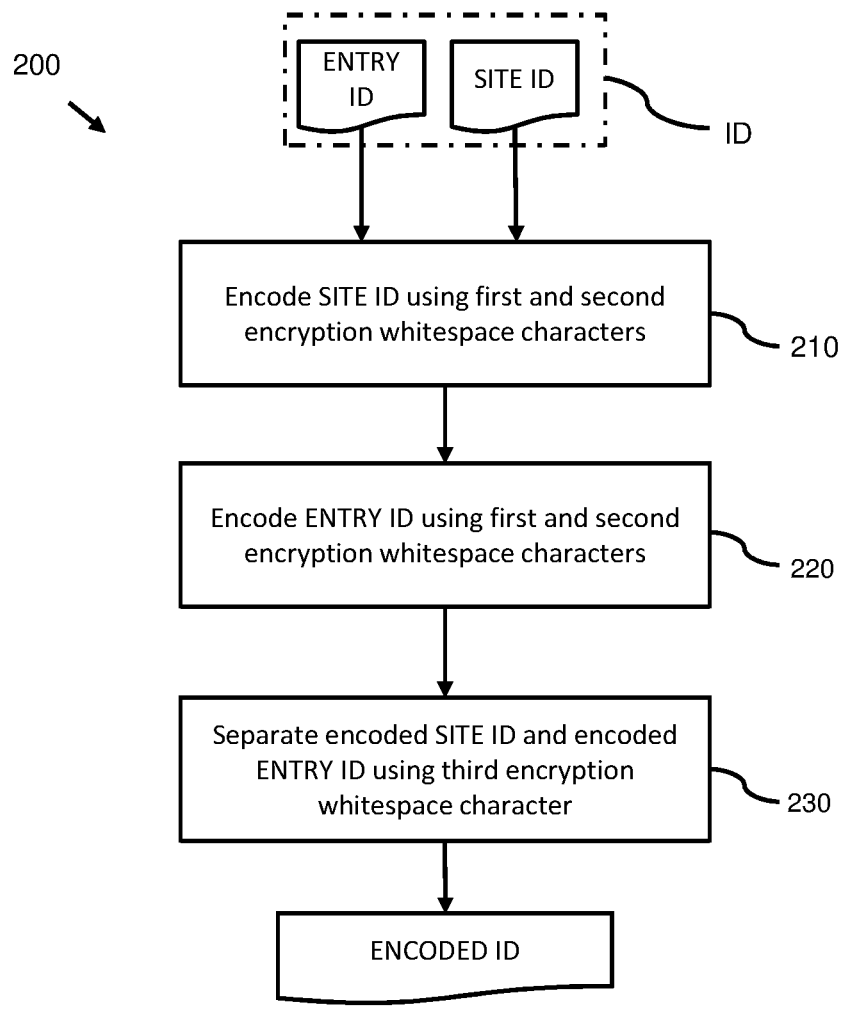
FIG. 2 illustrates a computer-implemented method of encoding identification data according to an embodiment.

With reference now to FIG. 2, an embodiment of a computer-implemented method of encoding 200 the identification data ID using a first set of encoded whitespace characters may be elucidated. The method of encoding 200 may be performed at step 121 of the method 100 of FIG. 1. As before, the identification data ID comprises a first identification data portion (SITE ID) and a second identification data portion (ENTRY ID).

The method of encoding 200 comprises encoding at step 210 the first identification data portion (SITE ID) using a first and second reference whitespace characters. In this way, an encoded first identification data portion (encoded SITE ID) may be obtained, the encoded first identification data portion comprising an encoded sequence of whitespace characters (i.e. from the first set of whitespace characters) representing the first identification data portion.

The method of encoding 200 further comprises encoding at step 220 the entry ID using the first and second reference whitespace characters. In this way, an encoded second identification data portion (encoded ENTRY ID) may be obtained, the encoded second identification data portion comprising an encoded sequence of whitespace characters (i.e. from the first set of whitespace characters) representing the second identification data portion.

The method of encoding 200 further comprises separating at step 230 the encoded first identification data portion (encoded SITE ID) from the encoded second identification data portion (encoded ENTRY ID) using a third reference whitespace character so as to form the encoded identification data ENCODED ID. In other words, the method comprises joining or concatenating the first and second identification data portion together, with a third reference whitespace character disposed between the two. By way of example, such encoded identification data may consist of the following sequence: SITE ID, third reference whitespace character, ENTRY ID. Alternatively, the encoded identification data may consist of the following sequence: ENTRY ID, third reference whitespace character, SITE ID.

It will be apparent that the first, second and third reference whitespace characters are all distinguishable from one another, although each whitespace character has a similar or identical visual appearance.

Conceivably, the first, second and third whitespace reference characters may be formed from different numbers of the same whitespace character (e.g. first whitespace reference character may be formed from a single space, second whitespace character may be formed from two spaces and so on). However, it is particularly advantageous to use different whitespace characters, as some compilers, code viewers or even users may automatically remove repeated or excessive whitespace characters. By way of example, code viewers may automatically replace a whitespace character formed from two spaces with a whitespace character formed from a single space. Use of different (single) whitespace characters for reference whitespace characters advantageously increases the likelihood that the watermarked portion of code is preserved (in its entirety) when copied.

It may be preferable for the first set of reference whitespace characters to only include whitespace characters which do not affect the functionality of the code portion.

In particular, it has been recognized that, for selected programming, scripting or markup language, only particular forms of whitespace can be added without changing the functionality of the code portion. By way of example only, the first set of whitespace characters may comprise any two or more of the following (brackets identifying ASCII equivalents): Horizontal Tab (0x09), Newline (0x0a), Vertical Tab (0x0b), Form Feed (0x0C), Carriage Return (0x0d) and Space (0x20). Such whitespace characters may be particularly advantageous for in use for a BCPL/C derived language, also called "curly-bracket languages".

It has been recognized that in some code viewers, use of the whitespace characters Vertical Tab and Form Feed may introduce a visual character representation (e.g. '^K' and '^L' respectively). Thus, in even more preferable embodiments, the first set of whitespace characters may only comprise any two or more of the following whitespace characters: Horizontal Tab (0x09), Newline (0x0a) and Space (0x20).

Moreover, it has been further recognized that in at least one such language, comments are able to use the full range of Unicode characters. Thus, when inserting the encoded identification data in a comment, it is possible to make modifications to the document with even less visual impact. In other words, it has been recognized that a second set of characters may be used when encoding identification data for insertion or embedment into comments.

By way of example, the second set of reference whitespace characters (e.g. used for encoding identification data for insertion in comments) may comprise at least two of the following: U+FEFF ZERO WIDTH NO-BREAK SPACE, U+200B ZERO WIDTH SPACE, and U+2063 INVISIBLE SEPARATOR. Such whitespace characters may be particularly advantageous as little to no space may be used (i.e. zero width), minimizing the likelihood of visual impact for inserted identification data.

It will be apparent that the first set of reference whitespace characters, as above described, comprises printable whitespace characters, whereas the second set of reference whitespace characters comprises non-printable whitespace characters.

In some embodiments, more than two sets of reference whitespace characters may be used to advantage. It is further recognized that other methods of selecting the set of reference whitespace characters with which to encode the identification data may be performed.

By way of example, a third set of reference whitespace characters may be selected if a particular programming language (e.g. Python) is detected. In a further example, a fourth set of reference whitespace characters may be selected based on a length of the portion of code (e.g. if the code is greater than a predetermined length, the identification data will be encoded using a fourth set of reference whitespace characters).

In yet a further example, in response to the number of whitespace characters being greater than a second predetermined amount, the method may comprise determining to encode the identification data using a third set of reference whitespace characters.

In an embodiment, the method comprises injecting comments (e.g. if deemed necessary). By way of example, the method may comprise placing a respective comment at the start and end of a snippet (i.e. portion of code). This would provide the advantage of increasing an ease of identifying boundaries of copied code when scanning. Individual implementations may use different locations for injecting comments, depending on their own needs.

For the purposes of example, consider the following portion of code which comprises 245 existing whitespace characters, each of which has the potential to be replaced by a whitespace character of the encoded identification data:

```
#include <string>
#include <iostream>
#include <fstream>
#include <string.h>
int main(const int ARGC, const char* ARGV[ ])
{
    // Loop over the input files
    for(int i = 1; i<ARGC; i++){
        std::cout << ARGV[i] << std::endl;
        int totalWhitespace = 0;
        int spaceChars = 0;
        int tabChars = 0;
        int newlines = 0;
        char input;
        std::istream *fil;
        if(strcmp(ARGV[i],"-") == 0){
            // Read from stdin
            fil = &std::cin;
        }
        else{
            fil = new std::fstream(ARGV[i], std::fstream::in);
        }
        // Loop over all the character in the file
        while(*fil >> std::noskipws >> input){
            if(input == ' '){
                spaceChars++;
                totalWhitespace++;
            }
```

-continued

```
        else if(input == ' '){
            tabChars++;
            totalWhitespace++;
        }
        else if(input == '\n'){
            newlines++;
            totalWhitespace++;
        }
    }
    // Output results, no indentation
    std::cout << totalWhitespace << std::endl;
    std::cout << spaceChars << std::endl;
    std::cout << tabChars << std::endl;
    std::cout << newlines << std::endl;
  }
  return 0;
}
```

In some embodiments, leading whitespace and newlines may be ignored such that they are not considered as whitespace characters which are suitable for replacement by whitespace characters of the encoded identification data. In such embodiments, this exemplary portion of code may be considered to have 92 space characters, 100 tab characters and 53 newlines, making a total of 245 whitespace characters which may be replaced by whitespace characters of the encoded identification data. Ignoring the indentation of the code provided by the leading whitespace and newlines may help prevent loss of the encoded identification data since it is common for copied code to be re-indented. It will be appreciated that whilst the 92 whitespace characters in this exemplary portion of code are all spaces (ASCII 0x20), other whitespace characters may also be present which could be candidates for replacement by whitespace characters of the encoded identification data.

Figure 3:
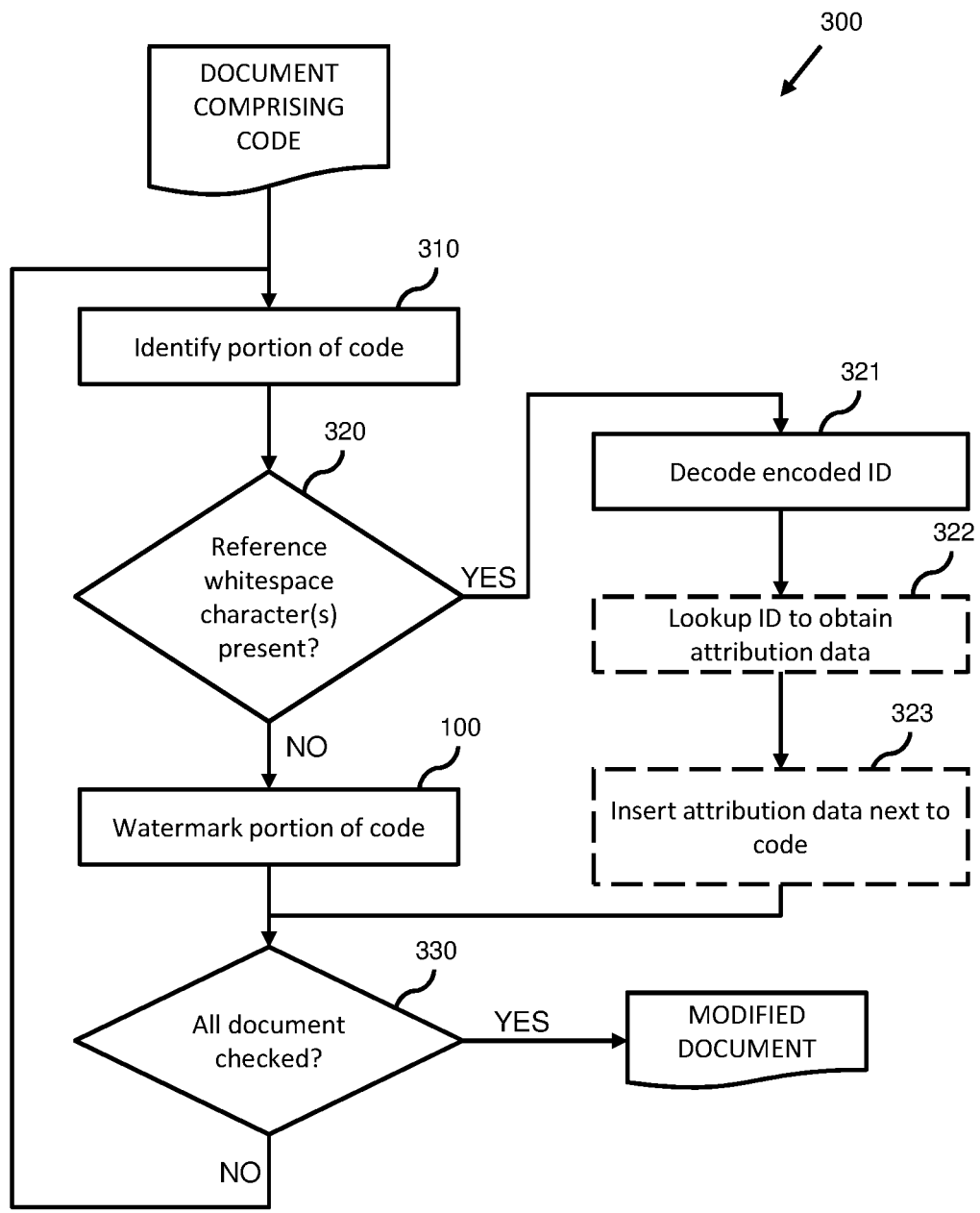
FIG. 3 illustrates a computer-implemented method of analyzing a document comprising code according to an embodiment.

With reference now to FIG. 3, a computer-implemented method of analyzing 300 or parsing a document comprising code may be elucidated. Such a document may, for example, be a webpage comprising portions of code (e.g. for tuition or exemplary purposes).

The method 300 comprises identifying at step 310 a portion of code in the document comprising code. By way of example, the identifying may comprise searching for typical language constructs, such as: square brackets [ ], curly brackets or braces { }, round brackets or parentheses ( ), semicolons ;, colons :, and so on. In other or further examples, the identifying may comprise searching for known code syntax, variables or instructions, such as: "#include", "<<", "unsigned int" and so on.

It is recognized that in some embodiments, no portions of code will be identified. In such embodiments, the method may pass or output the document without performing further analysis and with no amendments made to the document.

The method 300 comprises determining at step 320 whether at least one reference whitespace character is present in the identified portion of code. By way of example, the method may comprise determining whether first and second reference whitespace characters are present in the identified portion of code. In another example, the method may comprise determining whether a single reference whitespace character (e.g. first reference whitespace character) is present in the code.

Determining whether a reference whitespace character is present in the identified portion of code may be performed by comparing the code against a normalized version of the same code. For example, the code against which the determination as to whether a reference whitespace character is present is being made may be indented to ensure that the code uses standard indentation. Next, a normalized version of the code may be prepared by, for example, by performing lexical analysis of the code and ensuring that each token is separated only by a single space. The normalized version of the code may then be compared with the original code (with standard indentations). Any differences in whitespace therefore between the normalized code and the indented original code represent reference whitespace characters that are present in the code. As an example, if a small sample of the original code appears as follows:

```
#include <string.h>
    int  main(const int ARGC, const char* ARGV[ ])
``` then the code includes 3 spaces (ASCII 0x20) between the "#include" and "<string.h>", followed by 2 newlines (ASCII 0x0a), a tab (ASCII 0x09) before the "int" and 2 spaces and a tab (ASCII 0x20 and 0x09 respectively) between the "int" and the "main". This original code can then be modified to use standard indentation (e.g. by removing the superfluous tab before the "int") as follows:

```
#include <string.h>
    int   main(const int ARGC, const char* ARGV[ ]))
```

Finally, a normalized version of the code can be prepared by performing lexical analysis and leaving only a space or newline between tokens of the code:

```
#include <string.h>
int main(const int ARGC, const char* ARGV[ ])
```

This normalized version of the code includes a single space (ASCII 0x20) between the "#include" and the "<instream>", a newline (ASCII 0x0a) between the "<instream>" and the "int" and another space (ASCII 0x20) between the "int" and the "main( )". Therefore, comparing this normalized version of the code to the copy of the original code which uses standard indentation yields a sequence of reference whitespace characters of space, space, newline, space tab (i.e. ASCII codes 0x20, 0x20, 0x0a, 0x20, 0x20, 0x09).

It will be apparent that identification of the reference whitespace character(s) is indicative that the portion of code is likely to comprise encoded identification data.

In response to determining that at least one reference whitespace character is present in the identified portion of code, the method 300 comprises decoding at step 321 the encoded identification data to obtain decoded identification data (hereafter decoded ID).

In response to determining that no reference whitespace characters are present in the identified portion of code, the method may comprise watermarking 100 the portion of code as previously described with reference to FIG. 1.

The method 300 may further comprise determining at step 330 whether the entire document (comprising code) has been checked. It has been recognized that a document may comprise more than one portion of code associated with, for example, different authors or different entries in a database.

In response to determining that the entire document has not been checked (i.e. not all portions of code have been identified), the method 300 comprises repeating the step of identifying 310 a portion of code as previously described.

In response to determining that the entire document has been checked, the method 300 comprises outputting the modified document. It is recognized that in some embodiments (e.g. where each identified portion of code is already associated with an encoded ID) the document may not be modified. In such instances, the method may output the document comprising code without making any amendments to it.

In at least one embodiment, following decoding at step 321 of the encoded ID (for an identified portion) the method may comprise looking-up at step 322 the decoded ID (e.g. in a database or register) to obtain attribution data. By way of example, consider a scenario in which the decoded ID comprises a first identification data portion (SITE ID) and a second identification data portion (ENTRY ID). Presently, the first identification data portion (SITE ID) identifies a website, registry or database containing code portions available for public use. The second identification data (ENTRY ID) identifies an entry or record number (in the identified website, registry or database) which identifies a particular code portion.

In such a scenario, the method may comprise identifying the entry associated with the ENTRY ID on a database identified with the SITE ID) so as to obtain attribution data.

The method may further comprise inserting at step 323 attribution data next to, above, below or within the portion of code. By way of example, the attribution data may comprise a hyperlink to a website from where the portion of code originated. In another example, the attribution data may comprise a name of an author of the code. Such attribution data may, for example, be inserted as a comment in the code. In other embodiments, such attribution data may be inserted separately from the code (e.g. if the document is a webpage, it may be inserted away from the code).

In other embodiments, rather than looking-up at step 322 the decoded ID and inserting at step 323 attribution data, the method may comprise notifying a user that identification data has been decoded and, optionally, presenting the user with the identification data. By way of example, if the method is carried out during a compiling procedure (i.e. by a code compiler), the method may comprise raising a compiler warning to notify the user or automatically generating a task in version control. By way of example, the identification data may indicate a website (URL) associated with the portion of code, and this may be provided to the user (in the compiler warning). In some embodiments, such a compiler will not permit the code to be correctly compiled without appropriate authorization (e.g. from the author of the code). This may be particularly advantageous for the purposes of licensing code portions.

Figure 4:
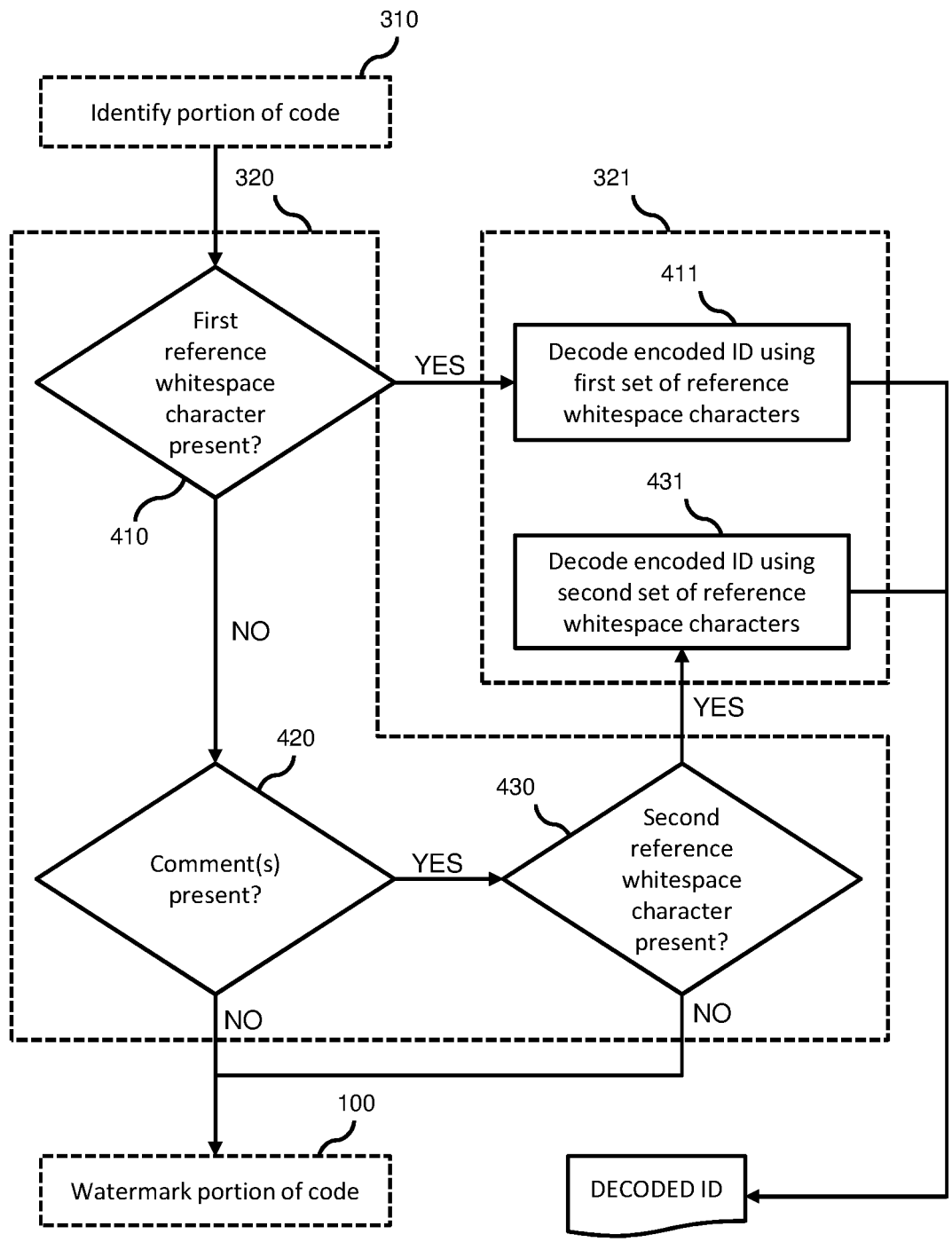
FIG. 4 illustrates a computer-implemented method of identifying and decoding encoded identification data in a portion of code according to an embodiment.

With reference now to FIG. 4, a computer-implemented method of determining at step 320 whether reference whitespace characters are present and decoding at step 321 encoded identification data (encoded ID) according to an embodiment, may be understood.

According to an embodiment, the determining at step 320 whether reference whitespace characters are present may comprise determining at step 410 whether a first reference whitespace character is present in the portion of code. In other words, the method may comprise searching the portion of code to identify whether a first reference whitespace character exists in the portion of code.

In response to determining that the first reference whitespace character is not present in the portion of code, the method comprises determining at step 420 whether at least one comment is present in the portion of code.

In response to determining that there is at least one comment in the portion of code, the method comprises determining at step 430 whether a second reference whitespace character is present in the portion of code and/or the at least one comment.

It has been recognized that the second reference whitespace character may be a whitespace character which may only appear in comments (e.g. as any whitespace character in the full range of Unicode characters may be used in comments, but are ignored or cause errors in the instructions of the code). As such, it may be more efficient to only search comments in the code for the second reference whitespace character.

According to various embodiments, the action performed in decoding at step 321 the encoded ID may depend upon the various steps of determining 410, 420, 430 performed during determining at step 320 whether reference whitespace character(s) are present.

In one example, in response to determining at step 410 that a first reference whitespace character is present, the decoding at step 321 the encoded ID comprises decoding at step 411 the encoded ID using a first set of reference whitespace characters.

In another or further example, in response to determining at step 430 that a second reference whitespace character is present, the method comprises decoding at step 431 the encoded ID using a second set of reference whitespace characters.

The first set of reference whitespace characters may be different to the second set of reference whitespace characters.

Figure 5:
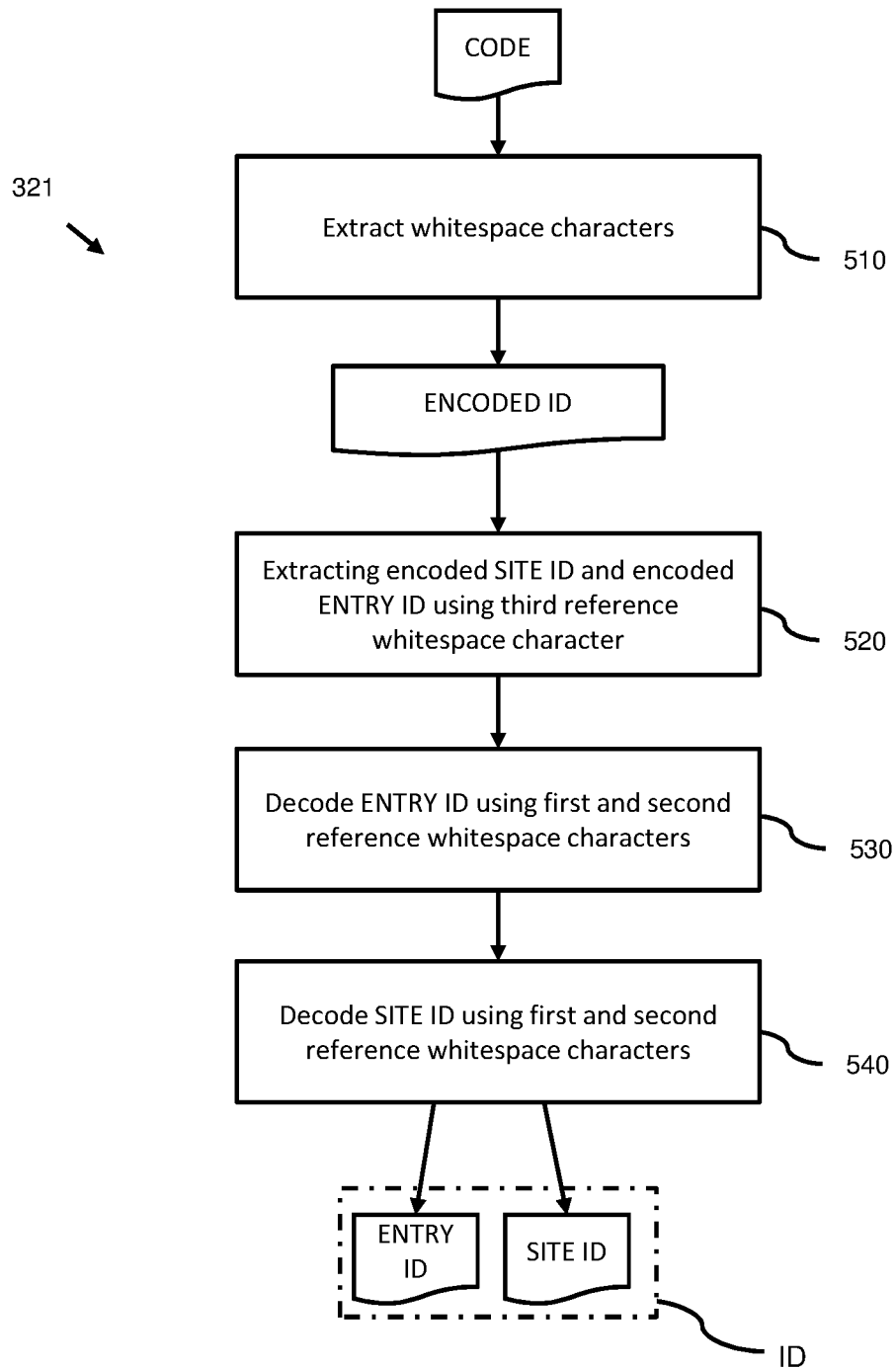
FIG. 5 illustrates a computer-implemented method of decoding encoded identification data according to an embodiment.

A computer-implemented method of decoding the encoded identification data (ENCODED ID), e.g., at step 321, according to an embodiment may be described with reference to FIG. 5. For the purposes of the present embodiment, it is assumed that the encoded identification data comprises an encoded SITE ID and an encoded ENTRY ID as previously described.

According to an embodiment, decoding the encoded identification data (e.g., step 321) comprises extracting at step 510 whitespace characters from the portion of code (CODE) so as to obtain the encoded ID. In some embodiments, the extracting at step 510 the whitespace characters comprises extracting all whitespace characters from the portion of code. In other embodiments, the extracting at step 510 the whitespace characters comprises extracting only whitespace characters which are in a predetermined set of reference whitespace characters (e.g. comprising a first, second and third reference whitespace character). By way of example, the predetermined set of reference whitespace characters may comprise either the first set of reference whitespace characters or the second set of reference whitespace characters as required. In this way the encoded ID may be extracted from the portion of code.

The method further comprises further extracting at step 520 the encoded SITE ID and the encoded ENTRY ID from the encoded ID using a third reference whitespace character. By way of example, the method may comprise: extracting all whitespace characters preceding the third reference whitespace character and determining these whitespace characters to be the encoded SITE ID; and extracting all whitespace characters following the third reference whitespace character and determining these whitespace characters to be the encoded ENTRY ID. As an example, the newline character (ASCII 0x0a) may be used to separate the SITE ID from the ENTRY ID. Therefore, returning to the example discussed earlier, if the reference whitespace characters were determined to be space, space, newline, space tab (i.e. ASCII codes 0x20, 0x20, 0x0a, 0x20, 0x20, 0x09), the SITE ID might be encoded by two spaces, whilst the entry ID might be encoded by two spaces and a tab.

The method further comprises decoding at step 530 the encoded SITE ID using a first and second reference whitespace characters so as to obtain a decoded SITE ID and decoding at step 540 the encoded ENTRY ID using the first and second reference whitespace characters to obtain a decoded ENTRY ID.

The decoding the encoded SITE ID or encoded ENTRY ID (or, in some embodiments, the encoded identification data ID) may comprise decoding a binary format or converting from a binary format to an alternative or visible format (e.g. a string or number).

There is also proposed a concept of a central registry (or database) which maps website URLS to individual IDs. By way of example, a central registry may be adapted to map a SITE ID of "001" to a first website URL and a SITE ID of "002" to a second URL.

Use of such a central registry may be advantageous to ensure the encoded identification data is as small as possible. This will increase the number of times the encoded identification data may be repeated in the portion of source code, thereby increasing the likelihood that an ability to attribute the portion of code may be maintained. By way of example, if a developer removes or copies only a part of the portion of the code, a smaller encoded identification data is more likely to also be copied across.

Figure 6:
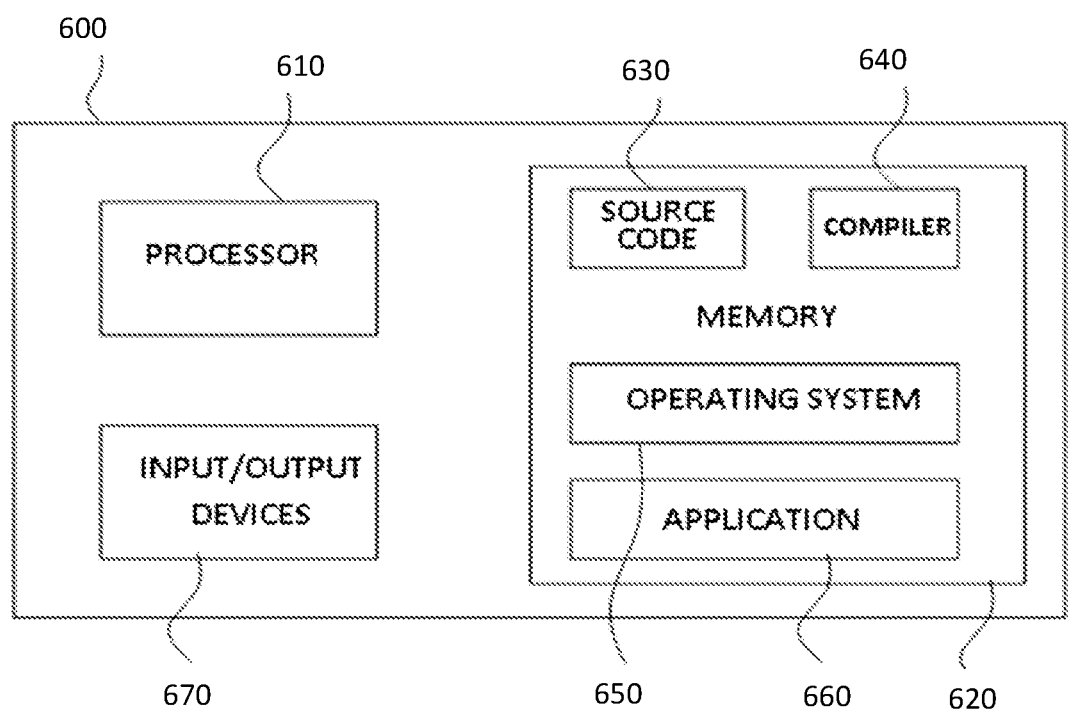
FIG. 6 illustrates an example of a computer device within which one or more parts of an embodiment may be employed.

FIG. 6 illustrates an example of a computer 600 within which one or more parts of an embodiment may be employed. Various operations discussed above may utilize the capabilities of the computer 600. For example, one or more parts of a system for censoring video may be incorporated in any element, module, application, and/or component discussed herein.

The computer 600 includes, but is not limited to, PCs, workstations, laptops, PDAs, palm devices, smartphones, image capture devices, video capture devices, internet-enabled displays, servers, storages, and the like. Generally, in terms of hardware architecture, the computer 600 may include one or more processors 610, memory 620, and one or more I/O devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a microprocessor.

The memory 620 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on a computer readable storage medium for use by or in connection with any computer related system or method. The application 660 can be embodied in a computer readable storage medium for use by or in connection with an instruction execution system, apparatus, or device, such as a computer-based system, processor-containing system, or other system that can fetch the instructions from the instruction execution system, apparatus, or device and execute the instructions.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The skilled person would readily understand that some of the various steps of the invention may be omitted without departing from the scope of the inventive concept. By way of example, the step of counting 110 the number of whitespace characters may be omitted. In another embodiment, the method may comprise only the steps of encoding 121 the ID and replacing 122 whitespace characters in the code. Other variations will be readily apparent to the person skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of watermarking a portion of code with identification data, the computer-implemented method comprising:
   determining, by a computing device, a number of existing whitespace characters in the portion of code;
   encoding, by the computing device, the identification data using a set of reference whitespace characters;
   embedding, by the computing device, the encoded identification data into the portion of code, wherein the embedding the encoded identification data comprises, based on the determined number of existing whitespace characters, either replacing existing whitespace characters in the portion of code with the encoded identification data or inserting the encoded identification data into the portion of code; and
   determining whether to encode the identification data using a first set of reference whitespace characters or a second set of reference whitespace characters based on comparing the determined number of existing whitespace characters to a predetermined threshold, wherein the predetermined threshold is based on a proportional length of the portion of code.

2. The computer-implemented method of claim 1, wherein the embedding the encoded identification data comprises: determining whether to replace existing whitespace characters with the encoded identification data or insert the encoded identification data into the portion of code based on the determined number of existing whitespace characters.

3. The computer-implemented method of claim 1, wherein, in response to the determined number of existing whitespace characters being more than or equal to a predetermined value, the embedding the encoded identification data comprises:
   replacing existing whitespace characters with respective whitespace characters in the encoded identification data.

4. The computer-implemented method of claim 1, further comprising identifying a comment in the portion of code.

5. The computer-implemented method of claim 1, further comprising creating a comment in the portion of code.

6. The computer-implemented method of claim 1, wherein, in response to the determined number of existing whitespace characters being more than or equal to the predetermined threshold, the encoding the identification data comprises:
   encoding the identification data using the first set of reference whitespace characters.

7. The computer-implemented method of claim 1, wherein, in response to the determined number of existing whitespace characters being less than the predetermined threshold, the encoding the identification data comprises:
   encoding the identification data using the second set of reference whitespace characters.

8. The computer-implemented method of claim 1, wherein the encoding the identification data comprises encoding the identification data using no more than three different whitespace characters.

9. The computer-implemented method of claim 1, wherein the encoding the identification data comprises:
   encoding a first identification data portion using first and second reference whitespace characters;
   encoding a second identification data portion using the first and second reference whitespace characters;
   forming the encoded identification data by joining the encoded first identification portion to the encoded second identification portion.

10. The computer-implemented method of claim 9, further comprising separating the encoded first identification portion and the encoded second identification portion in the encoded identification data with at least one third reference whitespace character.

11. The computer-implemented method of claim 1, further comprising:
    determining a length of the portion of code; and
    determining whether to perform watermarking of the portion of code based on the determined length of the portion of code.

12. The computer-implemented method of claim 1, wherein:
    the first set of reference whitespace characters are from a first set of characters; and
    the second set of reference whitespace characters are from a second set of characters different than the first set of characters.

13. The computer-implemented method of claim 1, wherein:
    the first set of reference whitespace characters comprises printable whitespace characters; and
    the second set of reference whitespace characters comprises non-printable whitespace characters.

14. The computer-implemented method of claim 1, wherein:
    a first identification data portion of the identification data identifies a location comprising one of a website, registry, and database containing plural code portions; and
    a second identification data portion of the identification data identifies a path, entry, or record number that identifies a particular one of the plural code portions.

15. A system for watermarking a portion of code with identification data, the system comprising:
- a processor, a computer readable memory, and a computer readable storage medium associated with a computer device; and
- program instructions stored on the computer readable storage medium for execution by the processor via the computer readable memory, wherein the program instructions cause the computer device to:
- determine a number of existing whitespace characters in the portion of code;
- encode the identification data using a set of reference whitespace characters; and
- embed the encoded identification data into the portion of code, wherein the embedding the encoded identification data comprises, based on the determined number of existing whitespace characters, either replacing existing whitespace characters in the portion of code with the encoded identification data or inserting the encoded identification data into the portion of code, wherein the embedding the encoded identification data into the portion of code comprises inserting the encoded identification data into more than one comment in the portion of code such that the encoded identification data is distributed across the more than one comment.

16. The system of claim 15, wherein in response to the determined number of existing whitespace characters being more than or equal to a predetermined value, and further comprising program instructions to replace existing whitespace characters with respective whitespace characters in the encoded identification data.

17. The system of claim 15, wherein the program instructions cause the computer device to determine whether to encode the identification data using a first set of reference whitespace characters or a second set of reference whitespace characters based on the determined number of existing whitespace characters.

* * * * *